United States Patent [19]

Oguro

[11] Patent Number: 5,481,415
[45] Date of Patent: * Jan. 2, 1996

[54] RECORDING/REPRODUCING APPARATUS THAT HANDLES BOTH DIGITAL AND ANALOG DATA AND DISTINGUISHES BETWEEN THE TWO

[75] Inventor: Masaki Oguro, Tokyo, Japan

[73] Assignee: Sony Corporation, Tokyo, Japan

[*] Notice: The portion of the term of this patent subsequent to Jul. 18, 2012, has been disclaimed.

[21] Appl. No.: 142,813

[22] Filed: Oct. 25, 1993

[30] Foreign Application Priority Data

Oct. 26, 1992 [JP] Japan .................................... 4-287875
Apr. 22, 1993 [JP] Japan .................................... 5-096238

[51] Int. Cl.$^6$ ................................................. G11B 15/07
[52] U.S. Cl. ................................. 360/69; 360/27; 360/132
[58] Field of Search .................................. 360/27, 69, 13, 360/137, 71, 132

[56] References Cited

U.S. PATENT DOCUMENTS

| | | | |
|---|---|---|---|
| 4,338,644 | 7/1982 | Staar | 360/69 X |
| 4,426,684 | 1/1984 | Sechet et al. | 360/13 |
| 4,593,337 | 6/1986 | Leone et al. | 360/137 |
| 4,652,944 | 3/1987 | Tindall | 360/33.1 X |

FOREIGN PATENT DOCUMENTS

| | | |
|---|---|---|
| 0373718 | 11/1989 | European Pat. Off. . |
| 4165444 | 6/1992 | Japan . |
| 4209470 | 7/1992 | Japan . |
| 8910615 | 11/1989 | WIPO ................................. 360/72.1 |
| 9102355 | 2/1991 | WIPO . |

Primary Examiner—Aristotelis Psitos
Assistant Examiner—James L. Habermehl
Attorney, Agent, or Firm—Jay H. Maioli

[57] ABSTRACT

A digital signal source and an analog signal source, such as might be contained in a video tape cassette, can be discriminated from each other in a video tape recorder by providing only a minimum of electrical contacts. A first contact is connected to a voltage source and a fourth contact is connected to ground, while second and third contacts are connected through resistors to the voltage source. The second and third contacts are respectively connected through fixed contacts of two change-over switches to a serial data line and to a serial clock line of a data processing circuit, and those contacts are also respectively connected through the other fixed contacts of the change-over switches to comparing input terminals of a group of comparators. A voltage-dividing circuit formed of resistors is connected to the voltage source and the voltages developed at respective voltage-dividing points are supplied to reference input terminals of the comparators and output signals from the comparators are supplied to data input terminals of a data processing circuit in the video tape recorder.

8 Claims, 9 Drawing Sheets

| Transmitting / Receiving Apparatus A Side | | Circuit Board B·C Side | |
|---|---|---|---|
| Contact b | Contact c | Contact b | Contact c |
| (2) | (2) | Open | Open |
| | | Circuit Board C | |
| (2) | (1) | Open | R |
| (2) | (0) | Open | Short |
| (1) | (2) | R | Open |
| (1) | (1) | R | R |
| (1) | (0) | R | Short |
| (0) | (2) | Short | Open |
| (0) | (1) | Short | R |
| (0) | (0) | Short | Short |

(2)  $\frac{2}{3}Vcc \sim Vcc$ (1)  $\frac{1}{3}Vcc \sim \frac{2}{3}Vcc$ (0)  $0 \sim \frac{1}{3}Vcc$

RECORDING/REPRODUCING APPARATUS THAT HANDLES BOTH DIGITAL AND ANALOG DATA AND DISTINGUISHES BETWEEN THE TWO

BACKGROUND OF THE INVENTION

Field of the Invention

The present invention relates to a data transmission apparatus that is connected with digital and/or analog signal sources.

In general, when a digital signal is used in data transmission its reliability can be improved with ease by the addition of a so-called error correcting code, such as a cyclic redundancy check code (CRC), a parity code or the like. Also, a bus-line system in which one line can be commonly utilized by a plurality of systems can be effected with ease.

In the case of an analog transmission in which the information is provided by voltage values or the like, there are drawbacks in that attenuation thereof is proportional to the transmission distance and the analog transmission system is susceptible to noise. Also, the analog transmission system cannot utilize means for improving a reliability, such as the CRC code, a parity code or the like. Therefore, the analog transmission system is not too suitable for long distance data transmission. Nevertheless, the analog transmission system can transmit data of a plurality of levels in addition to binary data of "1" and "0" in the digital signal transmission and is considered an effective means in short distance transmission.

The assignee of the present application has previously proposed an apparatus in which a memory integrated circuit (IC) is mounted inside of a magnetic tape cassette used in a VTR and a circuit board having an electrical contact is also formed therein. When such magnetic tape cassette is loaded in the VTR, the contact is brought in contact with a detection terminal of the VTR, so that inherent information relating to in the cassette that is stored in the memory IC (tape length, tape remaining amount, the number of times that the tape has been used, rental tape identity, or other tape information concerning record contents, such as table of contents, etc.) can be read out. Then, such information is displayed and operation of the VTR is controlled accordingly (see Japanese patent application No. 4-165444). In this case, information is read out from the VTR in a digital fashion.

Further, the assignee of the present application has previously proposed an apparatus in which a circuit board having similar contacts formed thereon is mounted on a magnetic tape cassette used in a VTR. When the contacts are short-circuited, opened or connected via resistors, the VTR can determine these conditions of the contacts so that the VTR side can detect and employ various information (tape thickness, kinds of magnetic materials, etc.) inherent in the magnetic tape cassette (Japanese patent application No. 4-209470). That is to say, the information discrimination can be carried out in an analog fashion.

When there are present a magnetic tape cassette from which information must be read out in a digital fashion and a magnetic tape cassette which must be discriminated in an analog fashion, the VTR must discriminate them satisfactorily and read out information from the magnetic tape cassette in a digital fashion or discriminate such magnetic tape cassette in an analog fashion. This requirement for a VTR to deal with tape cassettes in both a digital and analog fashion has presented several problems not only in the design of compatible hardware but, also, in the operating systems that can accept both kinds of data.

Thus, the problem solved by this invention relates to a magnetic tape cassette from which information must be read out in a digital fashion and a magnetic tape cassette which must be satisfactorily discriminated in an analog fashion to thereby carry out the digital reading or analog discrimination.

OBJECT AND SUMMARY OF THE INVENTION

Therefore, it is an object of the present invention to provide a system for transmitting information about the contents of a tape cassette to a video tape recorder that can eliminate the above-noted drawbacks inherent in previously proposed systems.

According to a first aspect of the present invention, there is provided a data transmitting apparatus to which a digital signal source or analog signal source is connected through an arbitrary number of electrical contacts. This apparatus is comprised of means for applying voltages to arbitrary ones of the plurality of contacts via predetermined resistors, comparators or the like respectively connected to the arbitrary contacts through switches for discriminating potentials developed at the arbitrary contacts, and a data processing circuit connected to the arbitrary contacts through the switches, wherein the digital signal source or analog signal source connected to the plurality of contacts is discriminated by using a discriminating signal from the comparators.

According to a second aspect of the present invention, there is provided the data transmitting apparatus described above, which further comprises a detector for detecting the connection of the digital signal source or analog signal source, wherein the switches are switched to the discriminating comparators by a signal from the detector and the switches are switched to the data processing circuit side when the discriminating signal is a predetermined signal.

According to a third aspect of the present invention, there is provided the data transmitting apparatus just described, wherein after the switches are switched to the data processing circuit side, the data processing circuit outputs a predetermined signal and when a predetermined returned signal is not output, it is determined that the analog signal source is connected to the data transmitting apparatus.

According to a fourth aspect of the present invention, there is provided the data transmitting apparatus of the above-described second aspect of the present invention, wherein after the switches are switched to the data processing circuit side, the data processing circuit outputs a predetermined signal and it is determined on the basis of a content of its output returned signal whether the contact or the transmission line is malfunctioning.

According to the present invention, the digital signal source and the analog signal source can be discriminated from each other satisfactorily and possible troubles with contacts or the like can be detected.

The above and other objects, features, and advantages of the present invention will become apparent from the following detailed description of illustrative embodiments thereof to be read in conjunction with the accompanying drawings.

DESCRIPTION OF PREFERRED EMBODIMENTS

Figure 1:
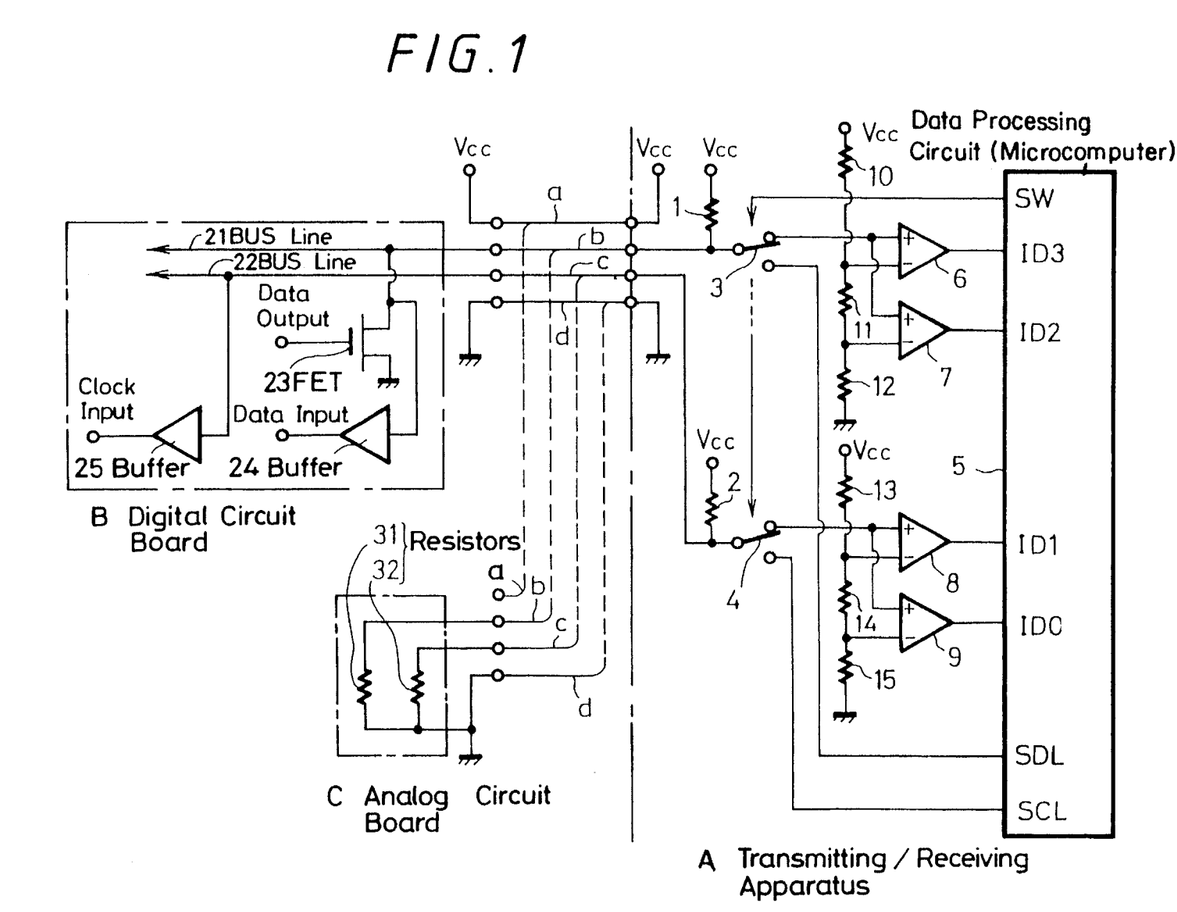
FIG. 1 is a block diagram showing a circuit arrangement of a data transmitting apparatus according to a first embodiment of the present invention.

In FIG. 1, reference letter A depicts a data transmission apparatus side, that is, a transmitting and receiving apparatus provided in a VTR. Reference letter B depicts a digital circuit board constituting a transmitting and receiving apparatus on which a memory IC serving as a digital signal source is mounted and in which contacts are formed. Further, reference letter C depicts a circuit board constituting a transmitting apparatus which disconnects or connects contacts serving as analog signal sources and which includes resistors. These circuit boards B and C are connected to the transmitting and receiving apparatus A through contacts and signal paths to d.

The circuit board B serving as the digital signal source includes a digital circuit such as a memory IC (not shown) or the like. In the circuit board B, the contact a is connected to a voltage source Vcc and the contact d is connected to ground. The contacts b and c are connected to internal bus lines 21, 22, respectively, that are connected to the memory IC (not shown). A data output field effect transistor device (FET) 23 and a data input buffer circuit 24 are connected to the bus line 21 connected to the contact b. A clock input buffer circuit 25 is connected to the bus line 22 connected to the contact c.

In the circuit board C serving as the analog signal source, the contact a is not connected and the contact d is connected to ground. Further, the contacts b and c are also connected to ground through resistors 31 and 32, respectively, each having an arbitrary resistance value.

For operation with such circuit boards B and C, the transmitting and receiving apparatus A is constructed as follows. As shown in FIG. 1, the contact a is connected to the voltage source Vcc and the contact d is connected to ground. Further, the contacts b, c are respectively connected through predetermined resistors 1, 2 to the voltage source Vcc. The contacts b, c are also connected through respective fixed contacts of change-over switches 3, 4 to a serial data line (SDL) and a serial clock line (SCL) of a data processing circuit 5, respectively. The data processing circuit 5 can be advantageously constructed as a microcomputer.

Further, the contacts b, c are connected through the other fixed contacts of the change-over switches 3, 4 to comparing input terminals of comparators 6, 7 and 8, 9, respectively. Voltage-dividing circuits formed of resistors 10, 11, 12 and 13, 14, 15 are connected to the voltage source Vcc, respectively, and voltages developed at respective voltage-dividing points are connected to reference input terminals of the comparators 6, 7 and 8, 9, respectively. The output signals from the comparators 6, 7 and 8, 9 are supplied to data input terminals ID0, ID1 and ID2, ID3 of the data processing circuit 5.

Accordingly, the contacts b, c are held at potentials of Vcc when the circuit board B in the disabled state is connected, because the FET device 23 and the buffer circuits 24, 25 all become open drains or open collectors and the resistors 1, 2 serve as pull-up resistors.

When the circuit board C is connected, if the resistance values of the resistors 1, 2 are taken as R and the resistance values of the resistors 31, 32 of the circuit board C are taken as either infinity (open), R, or 0 (short-circuit), then the potentials developed at the contacts b, c are set to Vcc, ½Vcc, or 0 (ground potential), respectively. If the resistance values of the resistors 10 to 15 are all set to the same value, then the comparators 6, 7 and 8, 9 can judge when the potential is ⅔Vcc or more, which is stated (2) when the potential is ⅓Vcc or more but less than ⅔Vcc, which is state (1) and when the potential is less than ⅓Vcc, which is state (0).

Therefore, according to this embodiment the three above states (2) to (0) can be judged by connecting the change-over switches 3, 4 to the comparators 6 to 9. For example, the nine different states shown in FIG. 2 can be judged. Thus, it is possible to know various information, such as thickness of tape, kinds of magnetic material, etc., inherent in a cassette when the analog circuit board C is connected to the apparatus.

Figure 2:
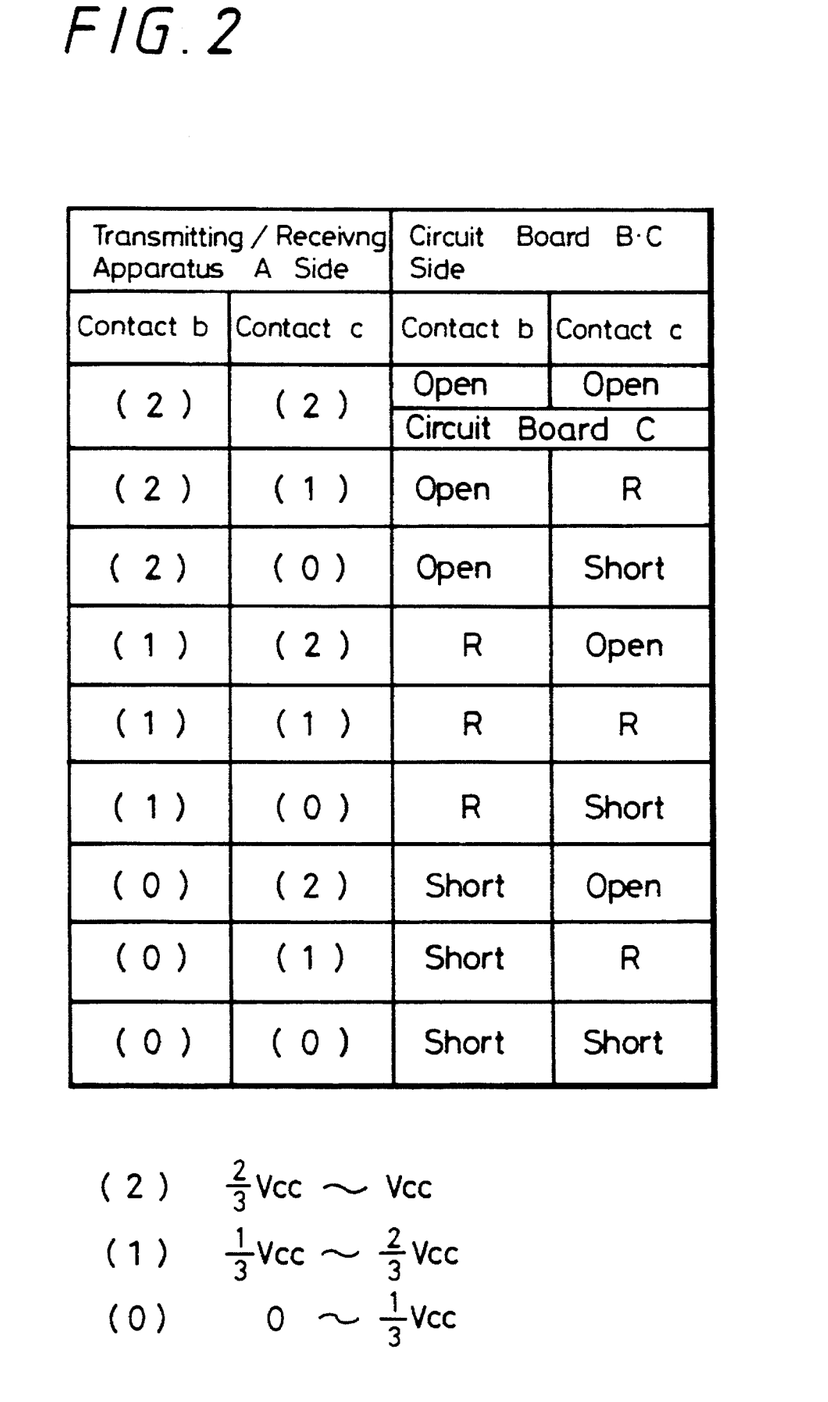
FIG. 2 is a table used to explain the operation of the data transmitting apparatus of FIG. 1.

In FIG. 2, when the contacts b, c are both in state (2) it cannot be determined whether the potential is Vcc because the resistance values of the resistors 31, 32 of the circuit board C are both infinity (open) or because the disabled circuit board B is connected to the apparatus. In this case, the change-over switches 3, 4 are respectively connected to the data processing circuit 5 side and the circuit boards B, C are judged according to the following procedure.

Figure 3A:
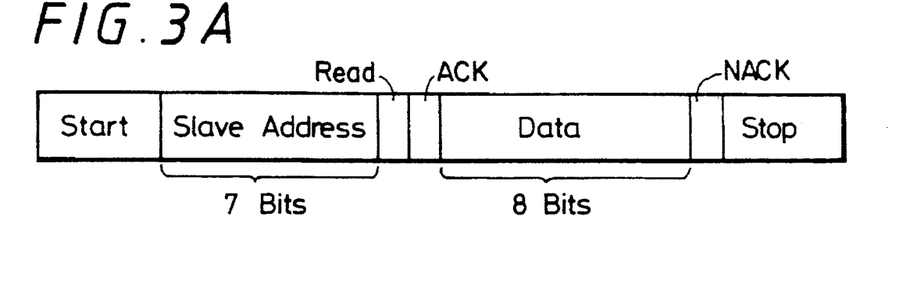
FIG. 3A is a diagram showing an example of a data format of the present invention.

FIG. 3A shows an example of a data format that comprises start condition data, a 7-bit slave address, 1-bit read condition data, 1-bit acknowledge data (ACK), 8-bit data, 1-bit not acknowledge data (NACK), and stop condition data.

Figure 3B:
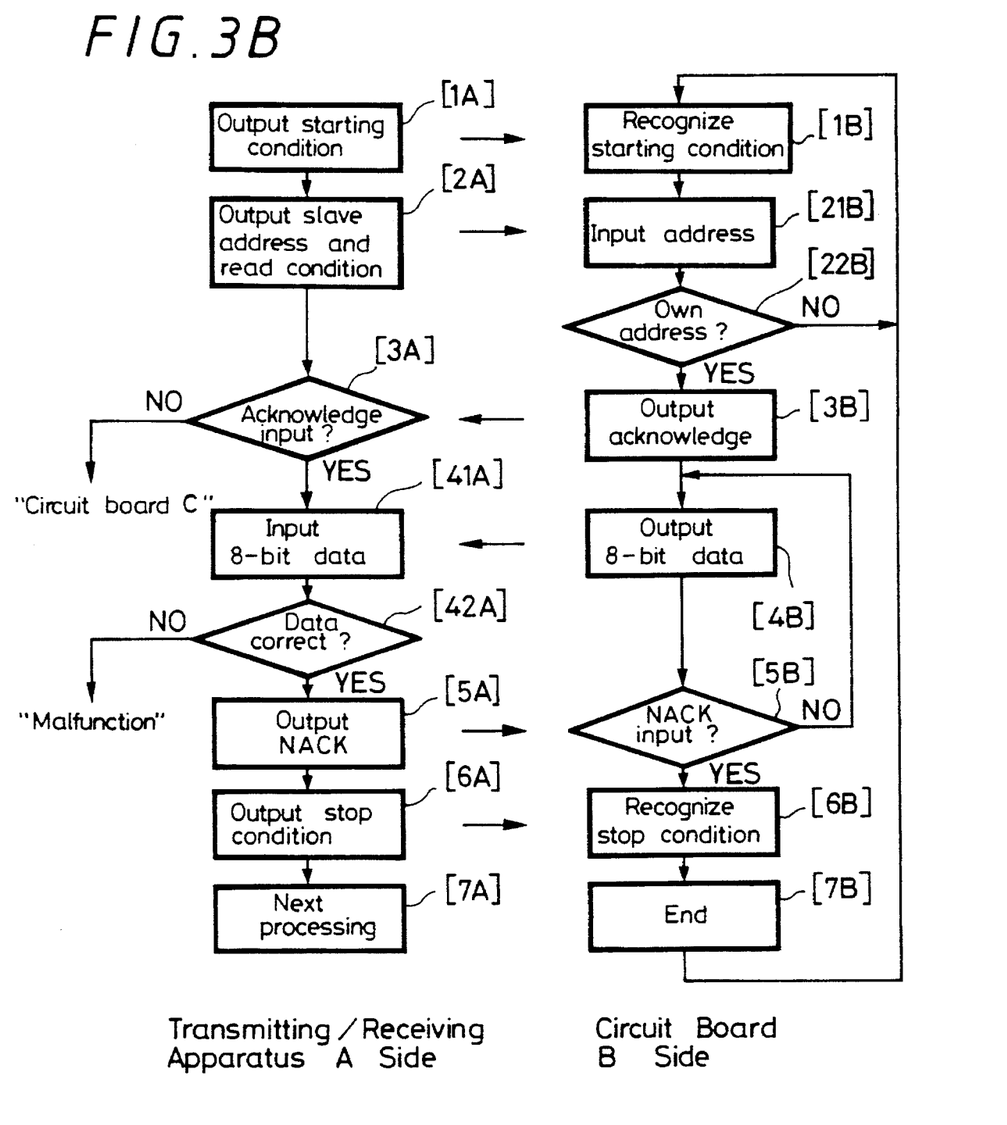
FIG. 3B is a flowchart useful in explaining operation of the data transmitting apparatus of the present invention.

As shown in FIG. 3B, when the start condition data is output at step [1A] of the transmitting and receiving apparatus A at the data processing circuit 5, the start condition data is recognized at step [1B] at the circuit board B side. When the slave address is output at the next step [2A], the slave address is input at step [21B]. It is determined in the next step [22B] whether the address is the address of the circuit board B. If the address is not the address of the circuit board B as represented by a NO at step [22B], then the processing returns to step [1B].

If it is determined at step [22B] that the address is the address of the circuit board B, then the acknowledge (ACK) low potential is output at step [3B]. It is determined at step [3A] whether the acknowledge (ACK) is at low potential and if it is not at low potential, the circuit board C is connected and it is determined that the resistance values of the resistors 31, 32 are both infinity (open) and the potential is Vcc. Then, operation is ended.

After the acknowledge is output at step [3B], predetermined 8-bit data, for example, "00000000", is output at step [4B]. The 8-bit data is input at step [41A] and it is determined in step [42A] whether or not the input data is correct. If the data is correct, then the NACK high potential is output at step [5A]. Further, it is determined in step [5B] whether or not NACK is at high potential. If it is not at high potential, then the processing returns to step [4B].

After NACK is output at step [5A], the stop condition data is output at step [6A], and other processing is executed at step [7A]. When the stop condition data is recognized at step [6B], the termination processing is executed at step [7B] and then the processing returns to step [1B].

Therefore, the selected one of the circuit boards B and C that is connected to the apparatus can be determined. When the circuit board B is connected to the apparatus, the change-over switches 3, 4 are fixed to the data processing circuit 5 side, respectively, and data is input and output in a method according to ordinary bus-line processing or the like. If it is determined in step [42A] that the input data is not correct, then the NACK high potential is not output, so that the 8-bit data is repeatedly output in step [4B]. If that data is repeatedly output an arbitrary number of times, it is determined that a malfunction of the contacts or of the transmission line has occurred. Then, an alarm or the like is generated.

As described above, according to this embodiment the digital signal source and the analog signal source can be discriminated satisfactorily and a malfunction of the contacts or of the transmission lines can be detected.

FIG. 1 shows a system using four contacts a, b, c and d, and FIG. 3 shows an example of a general purpose bus protocol for microcomputer using two lines of SDL and SCL. According to this protocol, a master CPU (not shown) supplies a slave address to the slave CPU, slave memory, or the like through the SDL line and the slave side acknowledges the slave address and returns the acknowledge to the master side. Thus, this protocol plays the role of an ordinary chip select (nCS), where n represents a negative logic.

Therefore, the three lines SDL, SCL, and nCs that are normally required to effect communication can be cut down to two lines, represented by SDL and SCL.

Figure 4:
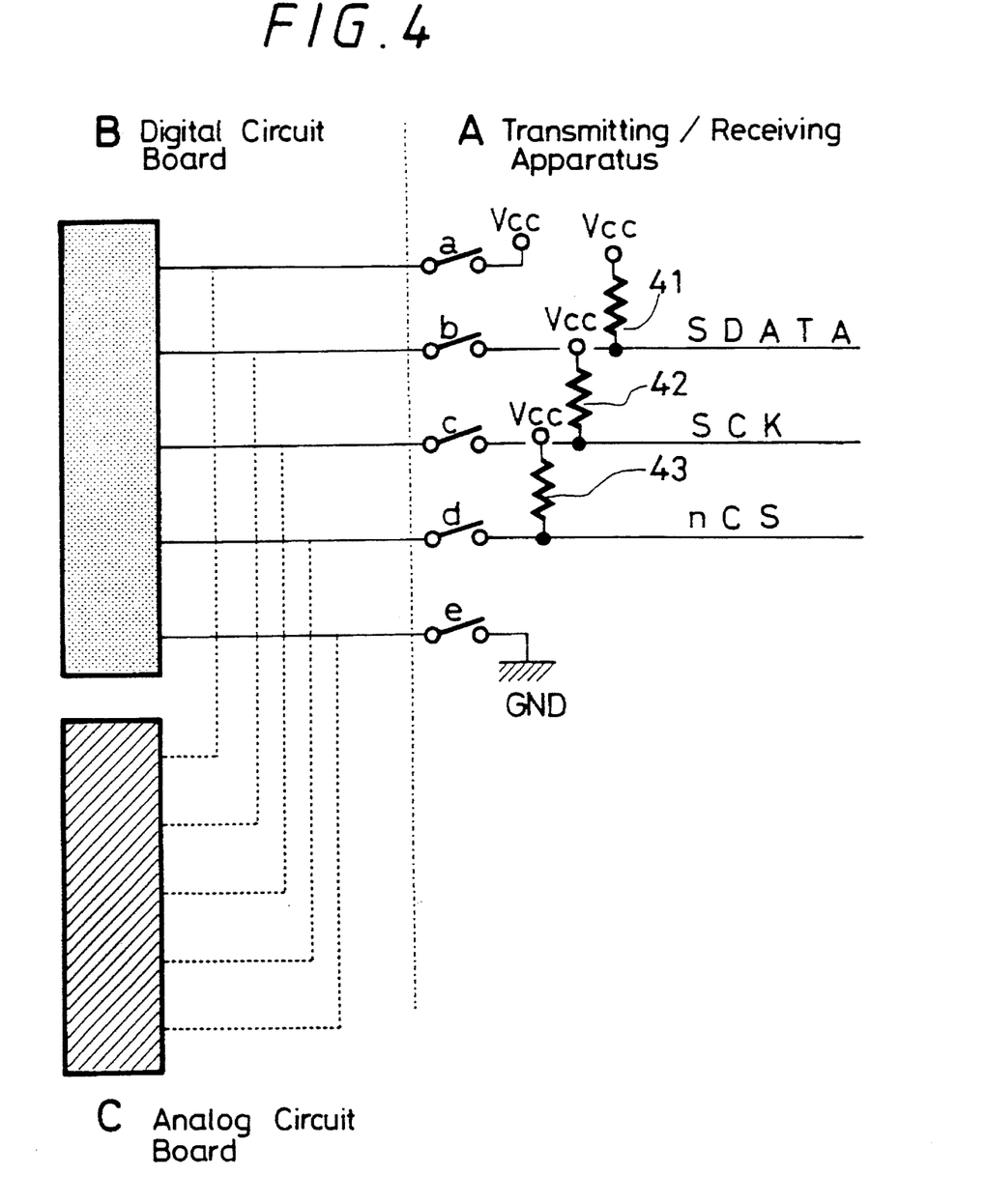
FIG. 4 is a diagram showing a circuit arrangement of the data transmitting apparatus according to a second embodiment of the present invention.

The present invention can also be applied to a system using a more general chip select and, as shown in FIG. 4, the transmitting and receiving apparatus A is connected through five contacts a, b, c, d, e to the digital circuit board B and to the analog circuit board C. The contact a is connected to the voltage source Vcc, and the contact e is connected to ground GND. The contacts b, c, d are connected to the lines SDATA, SCK, nCS, in that order. In accordance therewith, there are required three pull-up resistors 41, 42 and 43.

A microcomputer that is typically utilized in the VTR generally includes a serial transfer I/O port. The inside system of the VTR is arranged by using such serial transfer I/O port and FIG. 5 shows such internal system of the VTR.

Figure 5:
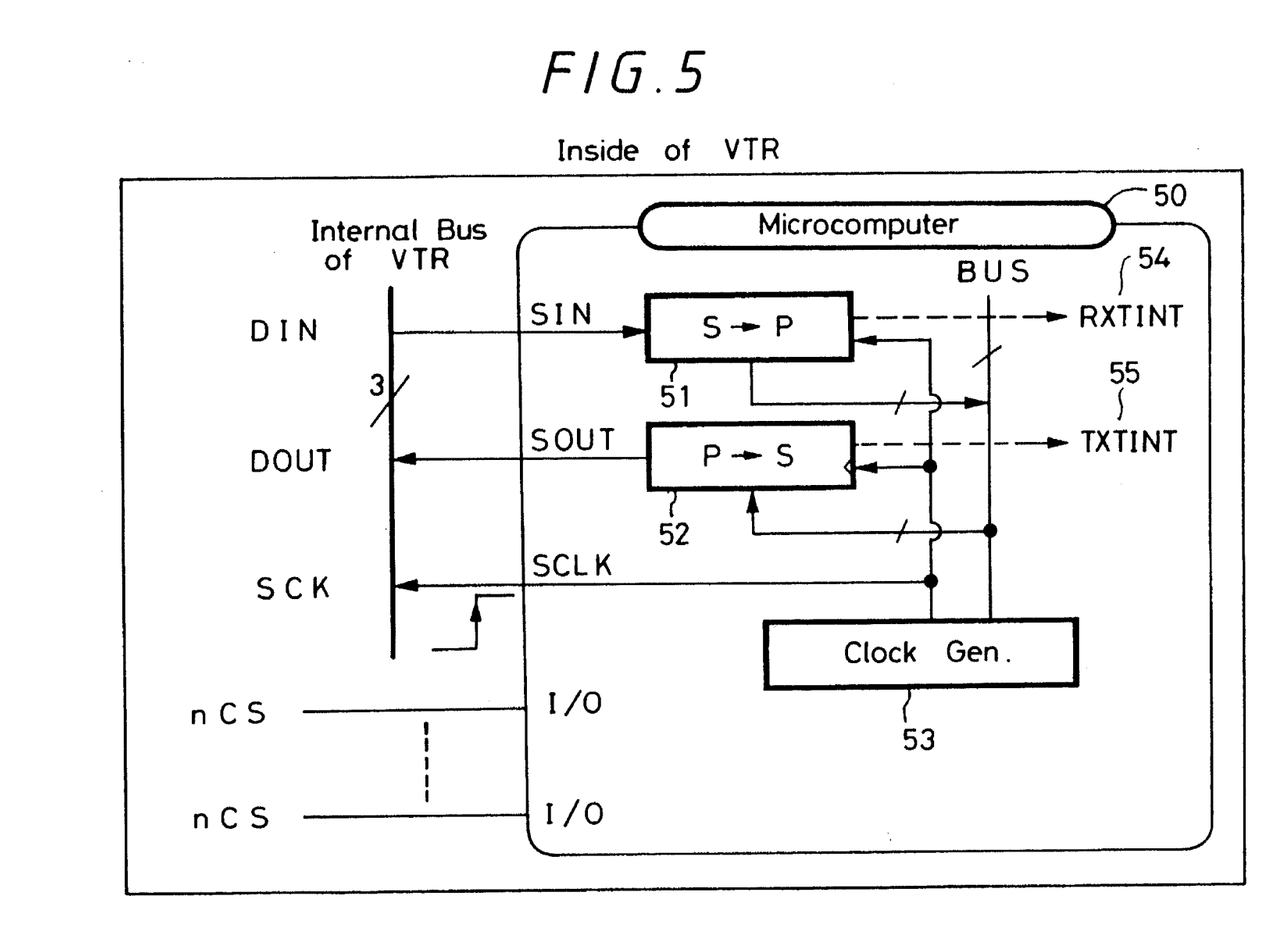
FIG. 5 is a diagram useful in explaining operations of a corresponding VTR.

Referring to FIG. 5, as serial transfer terminals there are provided a serial input terminal SIN, a serial output terminal SOUT, and a serial transfer clock output terminal SCLK. In order to select an equipment on which the serial transmission and reception are effected, the chip select signal (nCS) is output from the I/O port of the microcomputer 50. The three serial transfer terminals SIN, SOUT, SCLK are typically used in the internal bus of the VTR.

As shown in FIG. 5, input data supplied from the SIN terminal is converted into parallel data by a serial-to-parallel (S/P) converter 51. At that time, there is generated a reception interrupt signal (RXT INT) 54 indicative of the reception of data. Then, the microcomputer 50 executes the data reception processing.

When data is transmitted, output data is set in a parallel-to-serial (P/S) converter 52. When the data transfer is ended, a transmission interrupt signal (TXT INT) 55 is generated to enable the microcomputer to know the end of transfer. The important transfer clock is generated by a clock generating circuit 53 and fed to convertors 51, 52 and at the output clock SCLK.

According to the serial transfer I/O port, the transmission and reception of data can be processed automatically by the microcomputer 50. In addition, the interrupt occurs in the data transmission and reception, so that the work of the software can be reduced considerably. This function is indispensable to a multi-microprocessor system, that is, a system for controlling a number of microcomputers in linkage, that is generally utilized in the VTR. For this reason, the serial transfer I/O port is connected to the internal bus of the VTR.

Figure 6:
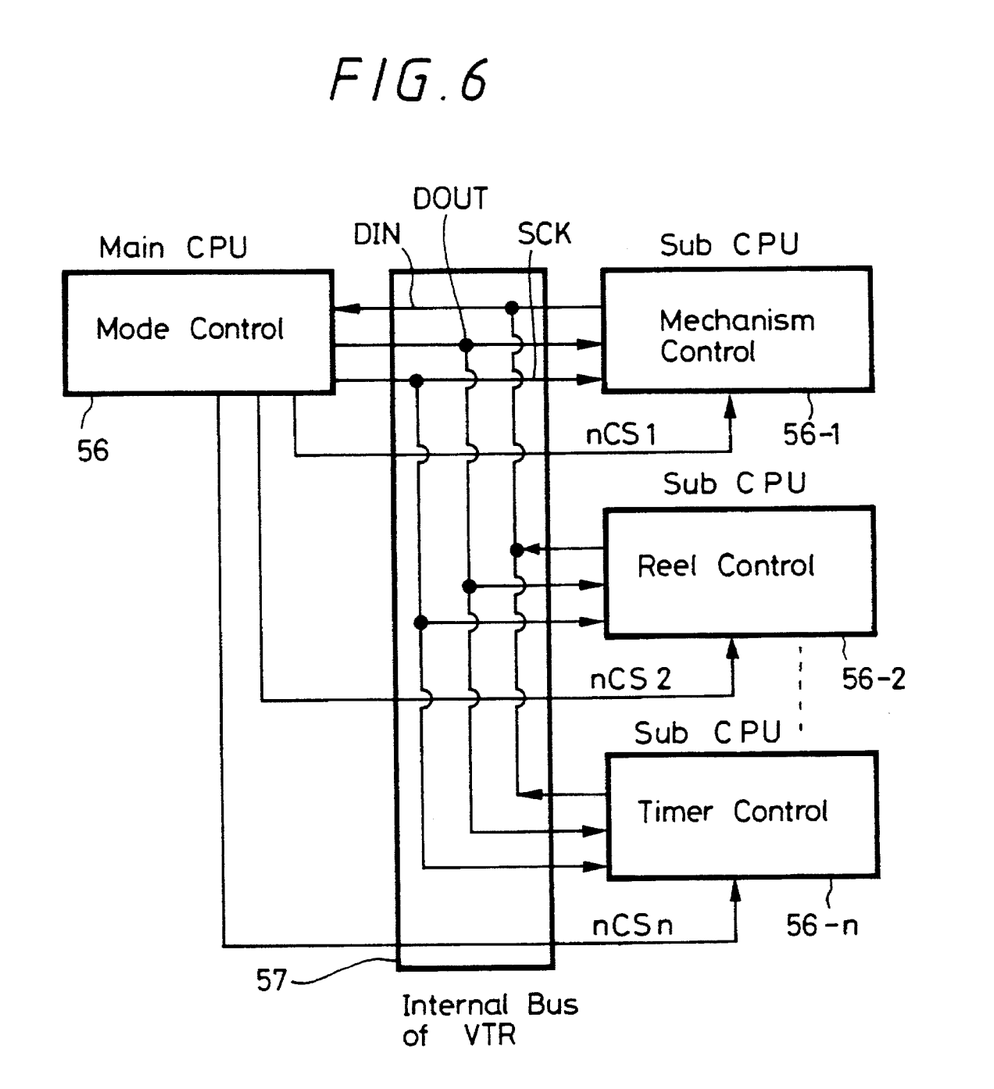
FIG. 6 is another diagram useful in explaining operation of a corresponding VTR.

FIG. 6 shows an example of the multi-microprocessor system typically utilized inside the VTR, which a microcomputer that generally controls the mode is operated as a main CPU 56 to control the internal bus 57, that is, the microcomputer has an initiative for the clock SCK and the chip select nCs. Other microcomputers are operated as sub CPUs 56-1, 56-2, . . . 56-n to effect the processing organically under the control of the main CPU56. The number of sub CPUs, 56-n, is generally different depending upon the VTR.

Considering the case in which the data transmission apparatus shown in FIG. 4 is applied to the internal bus of the VTR. In the case of the system that is connected to the outside through contacts, such system must be protected from static electricity of high voltage or the like. When the internal bus is merely connected to the contacts, if some trouble occurs, then all CPUs, etc., that are connected to the internal bus are damaged fatally. To obviate the aforesaid defect, the internal bus is connected to the contacts through buffers. With this arrangement, only the buffers are damaged even if trouble occurs.

Figure 7:
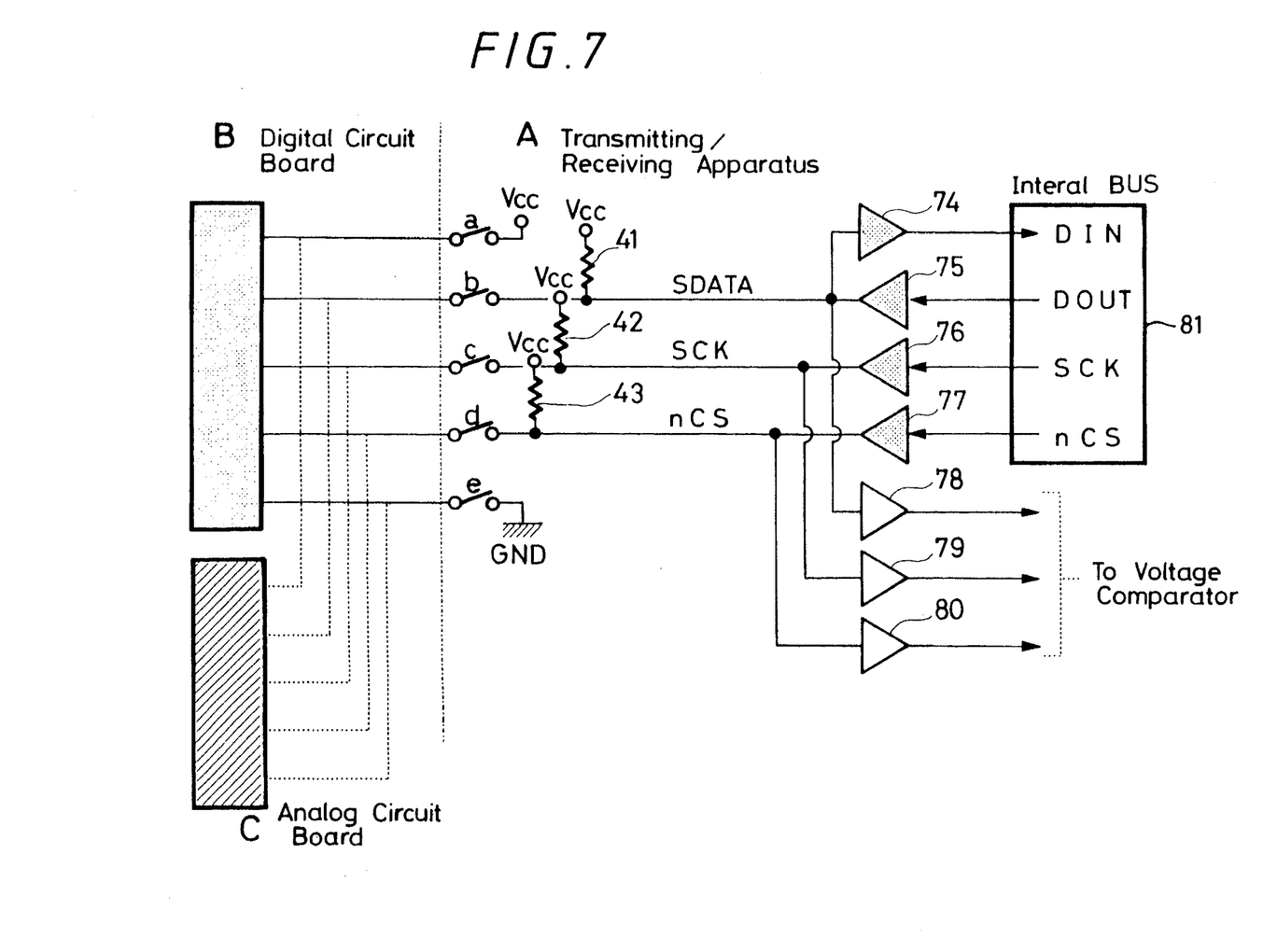
FIG. 7 is a diagram showing a circuit arrangement of the data transmitting apparatus according to a third embodiment of the present invention.

FIG. 7 shows such an example of the data transmission apparatus according to the present invention, in which buffers 74 through 77 function to protect CPUs or the like from being damaged. The reason that the direction of the buffer 74 is opposite to that of the other buffers 75 to 77 is to collect two lines DIN, DOUT as one line SDATA. The direction of data is switched by the main CPU56 shown in FIG. 6. When analog data is read, the internal buses 81 are connected through buffers 78, 79, 80 to voltage comparators corresponding to the comparators 6, 7, 8, 9 of FIG. 1. Outputs of these voltage comparators are supplied to the I/O port of the main CPU. The buffers 74 to 77 and the buffers 78 to 80 form two groups that function as the switches 3 and 4 in the embodiment of FIG. 1.

When the digital circuit board B and the analog circuit board C in FIG. 7 can be connected to the internal buses 81 of the VTR, the main CPU can control the digital circuit board B and the analog circuit board C in a manner similar to controlling other sub CPUs or the like connected to the internal buses. Therefore, the overall software arrangement can be simplified and debugging can be made easy.

In the processing procedure of this system initially, signals are switched to the side of the buffers 78 to 80 and voltage levels are recognized by the voltage comparators. The comparison of the voltage levels is the exactly the same as that of FIG. 2, to which contact d is added, though not shown.

That is to say, similarly to the contacts b and c provided when the above-mentioned circuit board C is connected, the states of (2), (1), (0) in the contacts b, c, and d can be discriminated. Thus, twenty-seven (3×3×3) different states can be discriminated, thereby making it possible to determine information, such as tape thickness, kinds of magnetic material, tape grade or the like, inherent in the magnetic tape cassette, for example, when the circuit board C is connected.

Nevertheless, in FIG. 7, when the contacts b, c, and d are all set in the states (2), it cannot be determined whether the resistance values of the resistors within the analog circuit board C are infinite (open) and held at Vcc or held at Vcc because the inoperative digital circuit board B is connected. Accordingly, in this case, the signals are switched to the side of buffers 74 to 77 and the circuit boards B and C are discriminated by the following procedure.

Figure 8:
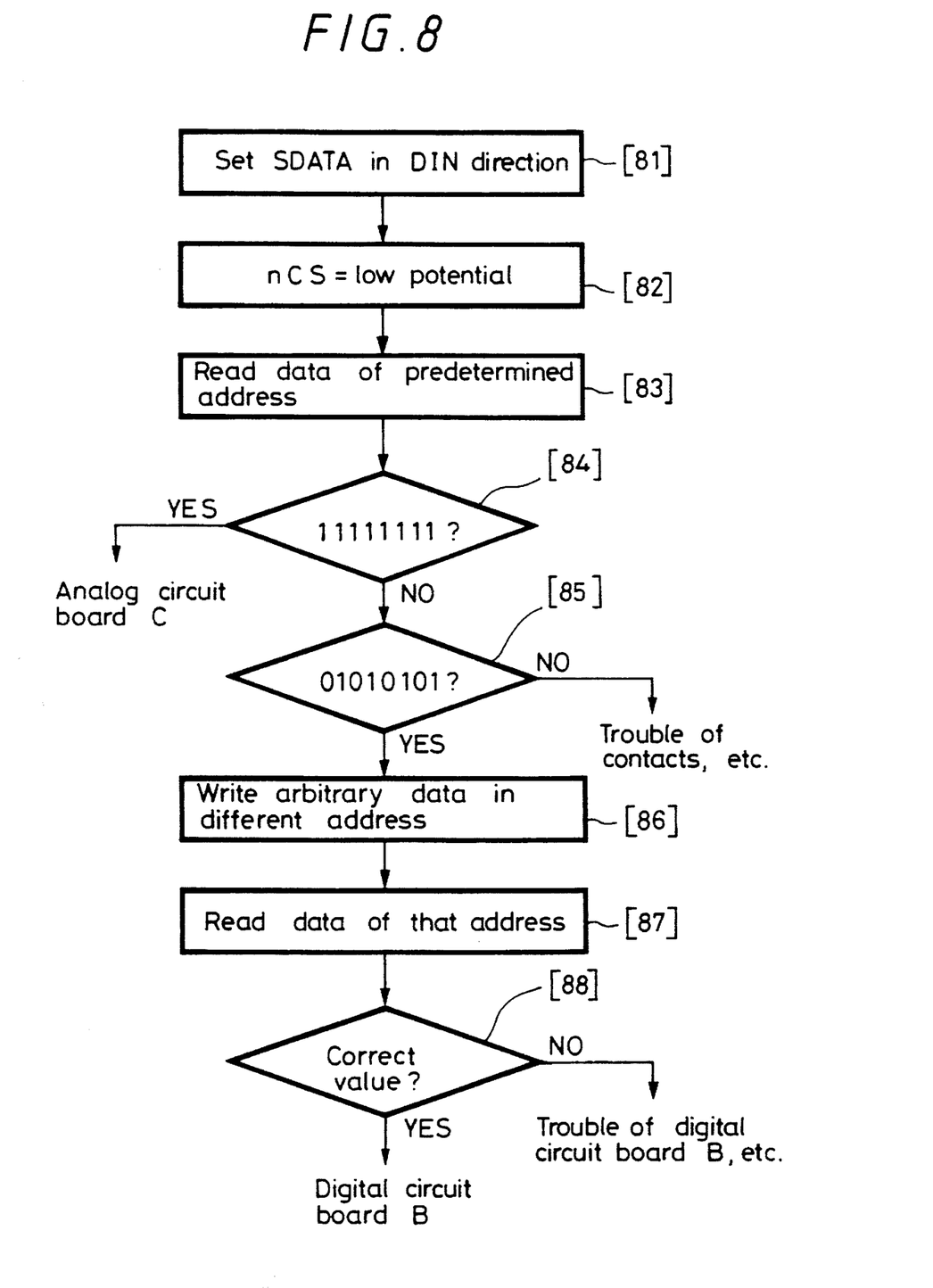
FIG. 8 is a flowchart useful in explaining operation of the data transmitting apparatus of FIG. 7.

More specifically, in FIG. 8 the buffer 74 is set in the active mode and the buffer 75 is set in the inactive mode, whereby the SDATA is switched to the DIN direction of the internal bus in step [81]. Then, nCS=low potential is established in step [82] and the 8-bit data (01010101) of a predetermined memory address is read out in step [83]. If the data thus read is 11111111, then it is determined that the circuit board is the analog circuit board C.

If the data thus read is not 01010101, then it is determined in step [85] that there is some trouble with the contact or the like. If the data thus read is 01010101, then it is determined that the circuit board is the digital circuit board B. To make sure of it, steps [86], [87] and [88] are executed, that is, arbitrary data is written in another address and the data thus written is read out to examine whether the data thus read is a correct value.

If the value of the data thus read is correct, then it is determined that the circuit board is the normal digital circuit board B. Also, it can be understood that the respective lines SDATA, SCK and nCS, the respective contacts and the buffer are operated correctly. If the value of the data thus read is not correct, then it is determined that the digital circuit board B or the like is in trouble. If reading and writing of data are carried out a plurality of times, then a reliability of judged results will be increased.

As described above, according to this embodiment apparatus, the digital signal source and the analog signal source can be discriminated from each other satisfactorily, and also any trouble with the contacts or the like can be detected.

In the above-mentioned apparatus, under the condition that the contacts b, c or contacts b, c, d are all in the so-called state (2), the circuit boards B, C must be discriminated from each other. Also, under this condition, the contacts b, c or contacts b, c, d of the circuit board C are all made open and the cassette body does not need any circuit arrangement or the like. Accordingly, if this state is set to the most standard cassette information, then a manufacturing cost of the most standard cassette can be made low.

Further, in the above-mentioned apparatus the connection upon insertion of the cassette of the circuit boards B, C is detected by a system control circuit (not shown) or the like. If the change-over switches 3, 4 are respectively switched to the comparators 6 to 9 by this detected signal in FIG. 1 and the signal is switched to the buffers 74 to 77 by this detected signal in FIG. 7, then the succeeding processing can be executed smoothly.

In FIG. 3, because the acknowledge ACK is returned from the circuit board side as an answer, it is determined on the basis of this answer whether or not the digital circuit board is in the normal condition. In FIG. 8, such an answer is not obtained, so that the data is written in another different address and read out therefrom so as to check the state of the digital circuit board. Needless to say, if the steps [85] to [88] in FIG. 8 are added to the processing in FIG. 3, then it can be determined more accurately whether the digital circuit board is in the normal condition.

More specifically, the judgement of the analog circuit board C in step [3A] in FIG. 3B and step [4] in FIG. 8 must be carried out with care. That is, if any one of the contacts is deformed and is therefore not correctly brought in contact with the analog circuit board C, then a correct voltage value cannot be read out, that is, voltage levels at the contacts b, c or contacts b, c, d cannot be judged accurately. From this standpoint, some collective countermeasures, such as increasing the reliability of the mechanism or the like must be taken and also, it is important to set the decision making based on the voltage level so as to error on the side of safety.

One-chip microcomputers incorporate therein an A/D converter at the input and output section thereof so as to form the so-called analog input and output. In this arrangement, the terminal thereof can be switched as the A/D converter of analog input or input and output terminal of digital signal in use. Thus, the functions of the switches 3, 4 in FIG. 1 can be realized by software.

Figure 9A:
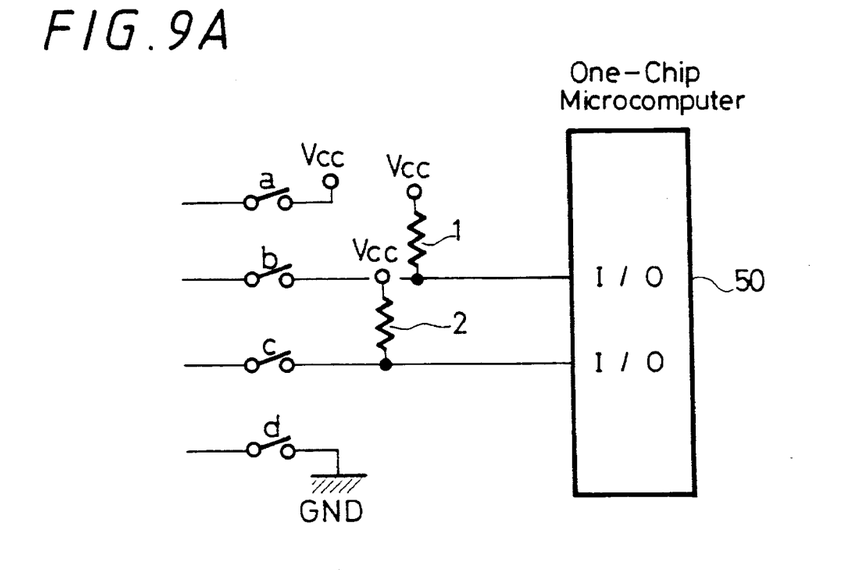
FIG. 9A is a diagram showing a circuit arrangement of the data transmitting apparatus according to a fourth embodiment of the present invention.

When the apparatus shown in FIG. 1 utilizes such one-chip microcomputer, such as shown in FIG. 9A, the contacts b, c are directly connected to an input and output section I/O of the one-chip microcomputer 50 and resistors 1, 2, which as pull-up resistors when a digital signal is input and also serve as voltage-dividing resistors when an analog signal is input, are connected to the contacts b and c, thereby making it possible to execute a function similar to the above function.

Figure 9B:
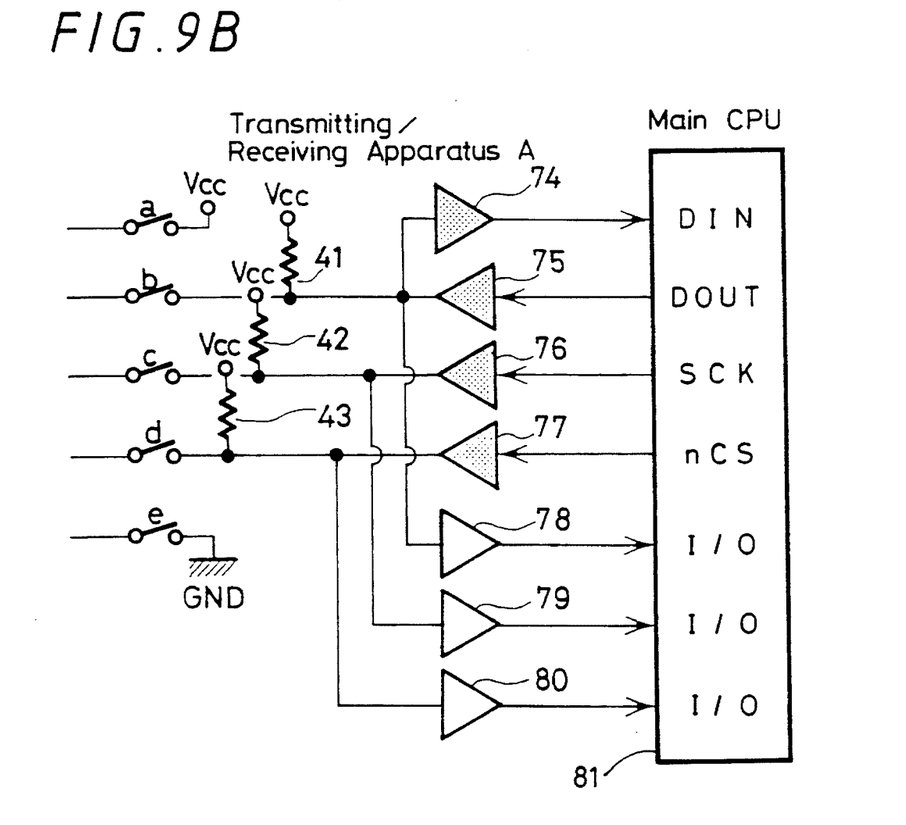
FIG. 9B is a diagram showing a circuit arrangement of the data transmitting apparatus according to a fifth embodiment of the present invention.

FIG. 9B shows a circuit arrangement in which the above-mentioned function is realized relative to the circuit of FIG. 7. As shown in FIG. 9B, outputs of the buffers 78, 79, 80 are connected to an I/O port of a main CPU 81 which is one-chip microcomputer having an A/D converter input and output function. The switching function can be realized by the buffers 74 to 77 and the buffers 78 to 80. In this example, the buffers cannot be omitted because it is dangerous if the internal bus of the VTR is directly connected to the terminals. Also, abnormal communication must be avoided when the resistors are directly connected to the bus line under the condition that the analog circuit board is connected.

In the case of FIG. 9A, the one-chip microcomputer 50 also provides the buffer function, so that if high-voltage static electricity is applied to the contacts or the like, then only the one-chip microcomputer 50 is damaged and the other circuits are prevented from being damaged.

Further, in this case, the A/D converter at the input and output section has 8-bit=256 resolution, for example, however, when the above-mentioned apparatus is applied to the magnetic tape cassette of the typical VTR, for example, it is desirable to use inexpensive resistors of low accuracy as the resistors 31, 32 on the circuit board C. Also, considering that resistance values change due to moisture on the resistors or the like, proper resolutions are more than ⅔Vcc, which is state (2), more than ⅓Vcc and less than ⅔Vcc, which is state (1), and about less than ⅓Vcc, which is state (0). Therefore, when the above 8-bit microcomputer is used, if the value that results from A/D-converting the input potential is classified into the range of states (2) to (0) and the input value is judged, then the similar function to the above can be realized.

The present invention can be applied to the case that the SDATA line in FIG. 7 is divided into two lines DIN and DOUT of the internal bus. In this case, there will be six contacts provided.

Furthermore, in the circuit shown in FIG. 1 and the protocol shown in FIG. 3, a 5-contact system in which contacts are provided only for the analog input and output may be considered. This method is similarly effected in FIG. 7 and the number of contacts can be increased freely. At any rate, a concept on the fundamental portion can be made by the present invention.

According to the present invention, the digital signal source and the analog signal source can be discriminated from each other satisfactorily and any trouble with the contact or the like can be detected.

What is claimed is:

1. In a data recording and/or reproducing apparatus a device for discriminating which of a digital signal source or an analog signal source is connected thereto through a plurality of contacts formed on a recording medium cassette containing the digital signal source or the analog signal source, the device comprising:

means for applying a voltage to selected contacts of said plurality of contacts via respective resistors having predetermined values;

switching means having inputs connected to said plurality of contacts;

potential discriminating means connected to said plurality of contacts through said switching means for discriminating potentials developed at said contacts and producing a discriminating signal; and data processing means connected to said plurality of contacts through said switching means, wherein said discriminating signal from said potential discriminating means identifies said signal source as digital or analog.

2. The device according to claim 1, wherein said data processing means produces a switch control signal and said switching means is switched to said potential discriminating means when said discriminating signal is in a first state and said switching means is switched to said data processing means when said discriminating signal is in a second state.

3. The device according to claim 2, wherein when said switching means is switched to said data processing means, said data processing means outputs a predetermined signal through said switching means to said plurality of contacts and when a predetermined returned signal is not received at said data processing means, it is determined that said analog signal source is connected to said data recording and/or reproducing apparatus.

4. The device according to claim 2, wherein after said switching means is switched to said data processing means by said control signal from said data processing means, said data processing means outputs a predetermined signal through said switching means to said plurality of contacts and determines on the basis of a content of a returned signal whether said contacts are malfunctioning.

5. In a data recording and/or reproducing apparatus a device for discriminating which of a digital signal source or an analog signal source is connected thereto through a plurality of contacts formed on a record medium cassette containing the digital signal source or the analog signal source or the analog signal source, the device comprising:

a plurality of resistors connected as a voltage divider;

means for applying a voltage to said plurality of contacts via said plurality of resistors;

switching means having movable terminals connected respectively to said plurality of contacts;

means connected to said plurality of contacts through said switching means and to said voltage for discriminating potentials developed at said plurality of contacts and generating a discriminating signal; and a data circuit having output signals connected to said plurality of contacts through fixed contacts of said switching means and receiving output signals from said means for discriminating, whereby said discriminating signal from said means for discriminating identifies said signal source as digital or analog.

6. The device according to claim 5, wherein said switching means is switched to said means for discriminating by a signal from said data processing circuit said switching means is switched to said data processing means side when said signal from said data processing circuit is a predetermined value.

7. The device according to claim 6, wherein when said switching means is switched to fixed contacts connected to said data processing circuit, said data processing circuit outputs a predetermined signal to said plurality of contacts and when a predetermined return signal is not received, it is determined that said analog signal source is connected to said data recording and/or reproducing apparatus.

8. The device according to claim 6, wherein after said switching means is switched to fixed contacts connected to said data processing circuit, said data processing circuit outputs a predetermined signal to said plurality of contacts and determines on the basis of a content of a return signal whether said contacts are in a malfunction state.

* * * * *